United States Patent
Scheb et al.

(10) Patent No.: US 11,984,550 B2
(45) Date of Patent: May 14, 2024

(54) DEVICE AND METHOD FOR MANUFACTURING A CELL STACK

(71) Applicant: GROB-WERKE Gmbh & Co. KG, Mindelheim (DE)

(72) Inventors: Thomas Scheb, Lichtenstein-Unterhausen (DE); Jürgen Paul, Loppenhausen (DE); Wolfgang Kühn, Bad Wörishofen (DE); Moritz Glück, Weilheim (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 227 days.

(21) Appl. No.: 17/605,020

(22) PCT Filed: Apr. 22, 2020

(86) PCT No.: PCT/EP2020/061123
§ 371 (c)(1),
(2) Date: Oct. 20, 2021

(87) PCT Pub. No.: WO2020/216758
PCT Pub. Date: Oct. 29, 2020

(65) Prior Publication Data
US 2022/0216503 A1    Jul. 7, 2022

(30) Foreign Application Priority Data

Apr. 23, 2019    (DE) .......................... 102019110472.6

(51) Int. Cl.
*H01M 10/04* (2006.01)
(52) U.S. Cl.
CPC ... *H01M 10/0404* (2013.01); *H01M 10/0459* (2013.01); *H01M 10/0463* (2013.01)
(58) Field of Classification Search
None
See application file for complete search history.

(56) References Cited

U.S. PATENT DOCUMENTS

| 5,123,160 A | 6/1992 | Hopwood |
| 5,431,530 A | 7/1995 | Kobayashi et al. |

(Continued)

FOREIGN PATENT DOCUMENTS

| CN | 106099153 A | 11/2016 |
| DE | 2723162 A1 | 11/1978 |

(Continued)

OTHER PUBLICATIONS

JP6331201B2—Machine translation (Year: 2016).*
German Search Report; priority document.
International Search Report; priority document.

*Primary Examiner* — Brian R Ohara
*Assistant Examiner* — Patrick Marshall Greene
(74) *Attorney, Agent, or Firm* — Greer, Burns & Crain, Ltd.

(57) ABSTRACT

A device for manufacturing a cell stack having a plurality of cell assemblies. The device comprises several positioning units accommodating the plurality of cell assemblies. The positioning units each comprise a positioning jaw enclosing the plurality of cell assemblies disposed one above the other. The device further comprises a first moving unit moving the positioning unit. The first moving unit comprises a moving plate mounted in a movable manner and an actuator. The positioning units are disposed on the moving plate. The actuator moves the moving plate. The positioning units are arranged such that the individual cell assemblies are centered between the positioning jaws by the movement initiated by the first moving unit. Finally, the device comprises a support, which is decoupled from the movement of the first moving unit, wherein the plurality of cell assemblies and/or plies rest on the support.

9 Claims, 4 Drawing Sheets

(56) References Cited

U.S. PATENT DOCUMENTS

2008/0120829 A1* 5/2008 Furukawa ........... H01M 8/2404
29/623.1
2016/0322664 A1 11/2016 Park et al.

FOREIGN PATENT DOCUMENTS

| DE | 3814413 A1 | 11/1989 |
| DE | 4130322 A1 | 3/1993 |
| DE | 102005044706 A1 | 4/2006 |
| DE | 102016213149 A1 | 1/2018 |
| EP | 0327208 A2 | 8/1989 |
| EP | 0561069 A1 | 9/1993 |
| EP | 1689015 A1 | 8/2006 |
| WO | 2015065082 A1 | 5/2015 |

\* cited by examiner

DEVICE AND METHOD FOR MANUFACTURING A CELL STACK

CROSS-REFERENCES TO RELATED APPLICATIONS

This application claims the benefit of the International Application No. PCT/EP2020/061123, filed on Apr. 22, 2020, and of the German patent application No. 102019110472.6 filed on Apr. 23, 2019, the entire disclosures of which are incorporated herein by way of reference.

FIELD OF THE INVENTION

The invention relates to a device for manufacturing a cell stack having a plurality of cell assemblies and/or plies, and to a method for operating the device according to the invention for manufacturing a cell stack.

BACKGROUND OF THE INVENTION

The production process of a lithium-ion battery cell comprises four main process steps. The main process steps include electrode manufacturing, cell assembly, formation and aging. Irrespective of the various cell forms—cylindrical cells, hard case cells or pouch cells—the smallest unit of each lithium ion cell is composed of two electrodes with an anode and a cathode and a separator separating the electrodes, i.e., the anode and cathode, from each other. Peripherally, the cathode may in this case be smaller than the anode by about 1 mm, for instance. The separator is the largest component of a battery cell and, peripherally, is larger than the anode by about 1 mm.

Numerous methods are known for manufacturing battery cells, such as winding, rolling or stacking, among others. In order to manufacture a battery cell, a stacking process is performed in the present case, in which the individual electrodes including the separator are stacked one above the other in several layers until a desired cell capacity has been obtained. An exact positioning of the electrodes—cathode and anode—is required in this process step. To maintain the exact position of the electrodes, these components are glued to each other and/or laminated in different orders—in a sequence of separator, anode, separator, cathode, or separator, cathode, separator, anode. In order to now manufacture a complete cell stack from many individual layers or laminated and/or glued cell assemblies, they are automatically placed in a position, via a handling and by means of a vacuum gripper, which is checked by means of image processing. This assembly requires workpiece supports with integrated hold-down devices that fix the individual cell assemblies in position after they have been placed one above the other.

A method of manufacturing an electrode unit for a battery cell is described in DE 10 2016 213 149 A1. In the method, a multitude of plies of an anode, plies of a cathode and plies of a separator are stacked in a stacking direction to form a ply stack. The ply stack is then disposed in such a way that the stacking direction extends at an inclination to a vertical direction. In a further method step, the ply stack is shaken until at least one edge of a multitude of plies of the anode, of the cathode and of the separator rests against at least one stop. Finally, the ply stack is mechanically fixed.

The invention has given itself the object of providing an improved device and an improved method for manufacturing a cell stack, by means of which a cell stack can be manufactured in a particularly simple, reliable and rapid manner, particularly for series production.

SUMMARY OF THE INVENTION

In order to achieve this object, the invention provides a device for manufacturing a cell stack as well as a method for operating a device for manufacturing a cell stack with the features of the independent claims. Advantageous embodiments with useful and non-trivial refinements of the invention are indicated in the dependent patent claims.

The invention provides a device for manufacturing a cell stack having a plurality of cell assemblies and/or a plurality of plies. In particular, a "cell assembly" has several electrically conductive elements, in particular a cathode and/or and anode, and at least one electrically insulating element. The cell assembly or cell assemblies may be a cell assembly or cell assemblies of a battery. Alternatively, a cell assembly may also include several electrically insulating elements. In particular, "plies" means individual or separate plies of several electrically conductive elements, in particular of a cathode and/or an anode, and/or of electrically insulating elements. The electrically insulating element may be, for example, an insulator which may also be referred to as a separator. The plies may be, for example, plies of a fuel cell or of a battery. For example, the plies of a fuel cell may include one or several bipolar plates and/or plies of a membrane-electrode assembly. A fuel cell stack may be formed of individual plies. The plies of the fuel cell stack, particularly the bipolar plate or plates and/or the membrane-electrode assembly, have different sizes. Preferably, the plies of the fuel cell stack have geometrically identical features that serve for aligning the differently sized plies.

Preferably, a cell assembly and/or the plies include, in each case arranged one above the other and next to each other, at least two electrically conductive elements and two electrically insulating elements. One of the electrically conductive elements may be configured as a cathode and the other electrically conductive element as an anode. For example, in a respective cell assembly and/or in the plies, a separator, an anode, a separator and a cathode, or a separator, a cathode, a separator and an anode, may be disposed next to each other or stacked in sequence. In the cell stack, several cell assemblies and/or plies are disposed, in particular, next to each other, particularly in a vertical direction of the device, or one above the other, or are stacked.

In particular, a battery cell includes at least one separator, one anode and one cathode. In this case, the separator is preferably larger than the anode and/or the cathode or forms the largest component compared to the anode and to the cathode. In particular, the separator preferably forms the largest component in terms of surface area, so that it is peripherally larger than the anode and the cathode. Preferably, the anode is larger than the cathode. In addition, the electrodes may have a contact tab. In order to obtain a functional battery cell, the plies of the battery cell are arranged next to each other or stacked in a fixed order. A separator, a cathode, an anode, a separator, a cathode, etc. may be arranged next to each other in sequence. In particular, the cell stack of the battery cell may be based on a laminate stack. In the cell assembly or cell assemblies or the laminates, the individual plies are preferably firmly connected to one another. Preferably, the plies are firmly connected to one another and have different dimensions. The firm connection is effected, for example, by means of an activated binder material in separator layers or, alternatively, by means of an adhesive. With respect to the structure of the cell assemblies, reference is made herein to PCT/DE2020/100240.

The device comprises several positioning units configured for accommodating the plurality of cell assemblies and/or plies. In other words, the several positioning units in their entirety are configured for accommodating the plurality of cell assemblies and/or plies. In other words, the plurality of cell assemblies and/or plies may be disposed in the positioning unit. Furthermore, the positioning units each comprise a positioning jaw, wherein the positioning jaws are configured for enclosing the plurality of cell assemblies and/or plies disposed one above the other. In particular, "positioning jaw" means a jaw that is configured as a movable lateral part or movable side surface for holding and/or guiding and/or positioning the cell assemblies. In particular, the positioning jaws may have a multi-part structure.

Furthermore, the device comprises a support, wherein the plurality of cell assemblies and/or plies rest on the support. For example, the support may be configured as a plate or plate-shaped workpiece. Preferably, the support may be disposed between the positioning units.

The device further comprises a first moving unit configured for moving the positioning units. In other words, the first moving unit is configured for setting the positioning units in motion. Particularly preferably, the first moving unit is configured for making the positioning units oscillate or having them vibrate.

The positioning units are arranged in such a manner that the individual cell assemblies and/or plies are centered centrally between the positioning jaws by the movement initiated by the first moving unit. The cell assemblies and/or plies can be centered between the positioning units by means of the moving unit. In particular, "centering" means an alignment of the center. In other words, the individual cell assemblies and/or plies can be aligned, in particular centered, between the positioning jaws by the movement of the positioning units. In other words, the cell assemblies and/or plies can be aligned above the center. To this end, the respective cell assemblies and/or plies rest loosely one above the other. By means of the movement, the individual plies of the cell stack are particularly preferably centered one above the other or placed or aligned one above the other in a congruent or parallel manner between the positioning jaws, which are, in particular, laterally attached. In particular, "centered" means centrally disposed, preferably between the positioning jaws, or aligned about a center point, preferably between the positioning jaws, or aligned towards a center, preferably between the positioning jaws.

The implementation of the device with the positioning jaws and the first moving unit is advantageous in that the cell stack can be manufactured particularly quickly, i.e., that a particularly rapid assembly can take place. Moreover, the device can be used for series production. Furthermore, the device has a particularly simple and compact structure due to the positioning jaws and the first moving unit. Finally, scaling to other cell formats or sizes can be carried out in a particularly simple manner using the positioning jaws.

Moreover, it is provided that the first moving unit comprises a moving plate mounted in a movable manner and an actuator. In particular, the moving plate is configured as a plate-shaped workpiece or support or plate. The moving plate may also be referred to as a vibration plate. Preferably, the moving plate is movably mounted on bearings, in particular on rubber bearings. The positioning units are disposed on the moving plate. In other words, the positioning units can be mounted on or attached to the moving plate. In this case, the positioning units are preferably disposed on a surface of the moving plate. The actuator is configured for moving, in particular vibrating or shaking, the moving plate. For example, the actuator may be configured as a vibrating motor. For this purpose, the actuator is preferably coupled to the moving plate. Using the moving plate and the actuator, the positioning units can be moved in a particularly simple and reliable manner, all together at the same time or also independently of one another, in order to align the cell assemblies and/or plies.

In addition, the support is decoupled from the movement of the first moving unit. In other words, the support and the first moving unit may be decoupled or separated from each other in terms of vibration. In particular, the support, as a supporting means for the cell assemblies and/or plies, is decoupled with regard to vibration from the first moving unit, preferably the moving plate, and the positioning units that are attached to the first moving unit and vibrate with it. Preferably, the moving unit vibrates and moves, and during the movement of the first moving unit, the support does not move or vibrate along with it.

Particularly preferably, the positioning units, preferably the positioning jaws, can be moved or vibrate individually or in pairs. In particular, the first moving unit may be configured for setting the positioning jaws in motion or vibration individually or in pairs. In other words, the positioning units, particularly the positioning jaws, can be moved individually or in pairs by the first moving unit. Preferably, the device includes four positioning jaws arranged, in particular in pairs, opposite each other. Two of the positioning jaws, preferably those opposite each other, are in each case moved simultaneously. In addition or as an alternative, all four positioning jaws may be moved at the same time. In addition or as an alternative, each individual positioning jaw may be moved independently of the others.

An advantageous embodiment provides that the positioning jaws are configured for carrying out an advancing movement, particularly towards the cell assemblies and/or plies. In particular, "advancing movement" means a movement of the positioning jaws towards the workpiece, in this case towards the cell stack or the cell assemblies and/or plies. In particular, the individual cell assemblies and/or plies are aligned above the center. In other words, the individual cell assemblies and/or plies are aligned centrically with respect to one another. Preferably, this is accomplished by means of the movable positioning jaws, preferably on all four sides of the cell stack, and by means of a support decoupled from the positioning jaws or a decoupled support plate. The support or support plate on which the cell assemblies and/or plies are stacked does not vibrate. In order to obtain an alignment above the center, the individual cell assemblies and/or plies can be displaced relative to one another in all four directions, particularly in the plane. In this case, the movement of the positioning jaws and the spacing between them can be specifically adjusted to the dimensions of the starting materials—cell assemblies and/or plies. Accordingly, all positioning jaws, particularly on both sides of the cell assemblies and/or plies, may be movable and/or move towards the cell assemblies and/or plies. For example, a further moving unit of the device or the first moving unit may be configured for moving the positioning jaws in order to execute the advancing movement. The further moving unit or the first moving unit may be configured for moving the positioning jaws individually or together or in pairs in order to execute the advancing movement.

Advantageously, the device comprises at least one air nozzle configured for providing an air flow, wherein the air nozzle, due to the air flow, is configured for aligning the cell assemblies and/or plies, particularly between the positioning units. Preferably, an air nozzle may be disposed on a positioning unit. Preferably, the device comprises several air nozzles, each of which provides an air flow. Particularly preferably, the device comprises four air nozzles, wherein one air nozzle is in each case provided on a positioning jaw. Particularly preferably, the air nozzles are configured for aiding the alignment of the cell assemblies and/or plies between the positioning jaws. For example, an air flow, which is directed onto the cell assemblies and/or plies between the positioning jaws, can be provided simultaneously with the movement of the positioning jaws and/or after the movement of the positioning jaws and/or prior to the movement of the positioning jaws. For example, the positioning jaws may have at a predetermined location, in particular centrally, one or more openings through which air can flow, which is provided by, in particular, an air nozzle. In particular the respective air flow passes through the opening or openings in the positioning jaws and hits the cell assemblies and/or plies.

Advantageously, the positioning units are attached to the moving plate, in particular positively, by means of a fastening device, and/or can be positioned thereon. For this purpose, the fastening device includes at least one fastening member, in particular a pin or a screw or a bolt, and/or a key member, in particular a key, wherein the respective positioning unit can be attached to and/or positioned on the moving plate by means of the at least one fastening member and/or key member. For example, the positioning may be realized by means of a pin seated in a sole portion of the respective positioning unit, and/or a key retained in the moving plate. In particular, the respective positioning units are connected to the moving plate via the fastening member and/or the key member. The respective positioning units can be fastened and/or positioned in a particularly simple and reliable manner by means of the fastening device.

Another advantageous embodiment provides that the positioning jaws of the positioning units, particularly on an inner side, each have a positioning surface. In other words, the respective positioning jaws may have on the inner side an inner surface, which, in particular, comes into contact or is in contact with the plurality of cell assemblies and/or plies. Moreover, the positioning surface is divided into at least two positioning surface portions. In other words, the positioning surface has several positioning surface portions—a first positioning surface portion and a second positioning surface portion. In this case, a first positioning surface portion has a smooth surface. In other words, a surface of the first positioning surface portion is configured in a planar or level manner A second positioning surface portion of the positioning surface has grooves. In particular, "groove" means a depression or channel or furrow extending, in particular, along an area or surface of the second positioning surface portion.

Another advantageous embodiment provides that the surface of the first positioning surface portion is configured to be inclined at a predetermined angle to the vertical direction of the device. In other words, the surface of the first positioning surface portion may be arranged obliquely to the vertical direction of the device. In other words, the surface of the first positioning surface portion may have an inclined portion or steep plane. For example, the surface of the first positioning surface portion may be disposed or oriented at an angle of between 5° and 90°, preferably between 5° and 45°, particularly preferably between 5° and 30°, to the vertical direction of the device. The inclined surface of the positioning surface portion is advantageous in that cell assemblies and/or plies can be pre-positioned with it, in particular slide into a predetermined position or slip along the surface of the first positioning surface portion.

In addition or as an alternative, the grooves of the second positioning surface portion preferably extend with a predetermined spacing, in particular parallel to each other, and at a predetermined angle, in particular to a transversal plane of the positioning unit, from an end portion of the positioning jaw to an opposite end portion or end of the positioning jaw. In other words, the grooves may run diagonally from the top to the bottom or from the top towards the bottom in an oblique manner. In particular, "transversal plane" means a transverse plane perpendicular to a longitudinal axis or vertical direction of the device or the positioning jaw. The transversal plane may also be referred to as a horizontal plane.

In addition or as an alternative, the first positioning surface portion is disposed, in the vertical direction of the device, above the second positioning surface portion, in particular for pre-positioning the plurality of cell assemblies and/or plies. In other words, the first positioning surface portion may be disposed on the second positioning surface portion. In other words, the first positioning surface portion and the second positioning surface portion may be disposed next to each other and/or one above the other.

Advantageously, the device has at least four positioning units. In this case, it is also preferred that two positioning units are in each case arranged opposite each other and the positioning surfaces of the positioning units face towards each other. In particular, the positioning units are arranged, in pairs, opposite each other. Particularly preferably, the positioning units, in particular sequentially, are disposed at right angles to one another, so that they enclose a rectangular or square surface or an accommodating portion. Particularly preferably, the first positioning surface portions, particularly due to the oblique surface, may together result in or form a funnel shape.

According to an advantageous refinement, it is provided that the device comprises a second moving unit disposed on the support. The second moving unit is configured for moving the support in a vertical direction of the device, particularly when moving the positioning units. In other words, the second moving unit is configured for moving the support upwards and/or downwards. In other words, the second moving unit is configured for lifting or lowering the support. In particular, the second moving unit comprises a lifting device disposed on the support, wherein the lifting device is configured for moving the support in a vertical direction of the device, particularly when moving the positioning unit. For moving the support, the second moving unit comprises a ball screw, for instance. The second moving unit is, in particular, a further moving unit separate and independent of the first moving unit, which causes the movement of the positioning jaws. In the second moving unit, a travel path and an axle speed may be varied or adjusted via an axle of the second moving unit. For example, the travel path and axle speed of the ball screw may be varied, via the axle, according to the dimensions, number and properties of the cell assemblies and/or plies. Moreover, the support may be disposed on a supporting member or several supporting members or rest thereon. In particular, the at least one supporting member or the several supporting members are disposed on an underside facing away from the positioning units or the cell assemblies and/or plies. The at least one supporting member or the several supporting members may be configured as a bar or rod or beam. In this case, the support can be moved together with the supporting members. In particular together, the second moving unit and/or the support may be referred to as a lifting device. Using the support and the second moving unit, the cell assemblies and/or plies can be moved or transported in between the positioning jaws in a particularly simple, rapid and reliable manner.

Advantageously, the device comprises a basic body, wherein the support and/or the positioning units and/or the first moving unit and/or the second moving unit are arranged on the basic body. In particular, the basic body may be configured as a base rack configured for retaining or mounting the support and/or the positioning units and/or the first moving unit and/or the second moving unit. Preferably, the basic body may be screwed to a machine table.

Another advantageous embodiment provides that the cell assemblies and/or plies include, in each case arranged one above the other, particularly in a vertical direction of the device, and next to each other, at least two electrically conductive elements and two electrically insulating elements, wherein one of the two electrically conductive elements, in particular peripherally, is configured to be larger and/or more rigid than the other electrically conductive element. In particular, a respective cell assembly and/or plies comprises or consists of four plies with two electrically conductive elements and two electrically insulating elements. For example, one electrically conductive element may be configured as an anode and the other electrically conductive element as a cathode. For example, the anode may be configured to be peripherally larger and/or more rigid than the cathode. In particular, the rigidity of the electrically insulating elements is lower than the electrically conductive elements or of at least one of the electrically conductive elements. In particular, "peripherally" means circumferentially. In other words, the anode may have a larger surface area than the cathode. In other words, the anode may be larger with regard to the surface area than the cathode. In particular, "rigid" means that one of the two electrically conductive elements has a higher rigidity than the non-conductive elements. In particular, the rigidity describes the resistance of a body against elastic deformation by a force or moment. In particular, the electrically conductive element are configured with a plate or disk shape. Furthermore, the electrically insulating elements are configured to be larger, in particular peripherally, than the larger electrically conductive element. For example, the electrically insulating element may be configured as an insulator. In other words, a surface of the electrically insulating element may be configured to be larger than the larger electrically conductive element. For example, a surface area of the insulator is larger than a surface area of the anode. For example, a separator or insulator, an anode, a separator, a cathode, or a separator, a cathode, a separator, an anode are arranged in this order.

The invention also includes a method for operating a device for manufacturing a cell stack having a plurality of cell assemblies and/or a plurality of plies. In this case, the device comprises several positioning units configured for accommodating the plurality of cell assemblies and/or plies, wherein the positioning units each comprise a positioning jaw, wherein the positioning jaws are configured for enclosing the plurality of cell assemblies and/or plies disposed one above the other. The device moreover comprises a first moving unit configured for moving the positioning units. The first moving unit comprises a moving plate mounted in a movable manner and an actuator, wherein the positioning units are disposed on the moving plate, wherein the actuator is configured for moving, in particular vibrating, the moving plate. The device further comprises a support, wherein the plurality of cell assemblies and/or plies rest on the support, wherein the support is decoupled from the movement of the first moving unit. In a method step, the plurality of cell assemblies and/or plies is arranged, one above the other, on the support, particularly in a vertical direction of the device. In other words, several cell assemblies and/or plies are placed or stacked on the support one above the other. In other words, the cell assemblies and/or plies can be placed on the support prior to or during centering. In other words, the cell assemblies and/or plies can be stacked on the support prior to centering. In other words, the cell assemblies and/or plies can be individually placed on the support one above the other. In a further method step, the first moving unit is moved so that the plurality of the cell assemblies and/or plies disposed one above the other is centered or aligned between the positioning jaws enclosing the cell assemblies and/or plies.

Another advantageous embodiment provides that the device further comprises a second moving unit. The second moving unit is disposed on the support. The second moving unit lowers the support in the vertical direction of the device, particularly when moving the positioning units in order to center the cell assemblies and/or plies. In other words, the cell assemblies and/or plies disposed on the support are accommodated or enclosed between the positioning units by the lowering or downward movement of the support.

A specific exemplary embodiment will be discussed below:

The individual cell assemblies or also plies are aligned above the center. All individual cell assemblies or also plies are aligned centrically with respect to one another. This is accomplished by means of movable positioning jaws on all four sides of the cell stack, and by means of a support decoupled from the positioning jaws. The support on which the cell assemblies and/or plies are stacked does not vibrate. In order to obtain an alignment above the center, the individual cell assemblies and/or plies are displaced relative to one another in all four directions, particularly in the plane. In this case, the movement of the positioning jaws and the spacing between them can always be specifically adjusted to the dimensions of the starting materials, i.e., particularly the cell assemblies and/or plies. In particular, centering above the center of all cell assemblies and/or plies can thus be accomplished even though the components, i.e., the cathode, the separator and the anode, have different sizes. In particular, "starting materials" means the material for the manufacture of a cell stack, i.e., the plies and/or cell assemblies or laminates. In this case, the method runs independently of gravity.

Advantageously, the cell assemblies and/or plies include, in each case arranged one above the other and next to each other, at least two electrically conductive elements and two electrically insulating elements, wherein the electrically insulating elements are at least partially folded in the vertical direction of the device during the movement of the cell stacks or cell assemblies and/or plies. In particular, the cell assemblies and/or plies are moved past the laterally located positioning units by moving the positioning units and lowering, in particular simultaneously, the support with the cell assemblies and/or plies disposed thereon. The electrically insulating element is folded upwards by this movement. Preferably, a marginal area of the electrically insulating element, in particular, a surface protruding over the electrically conductive elements, is folded upwards or folded or bent in the vertical direction. In other words, in particular, a part of the electrically insulating element protruding over at least one electrically conductive element is folded. In other words, the electrically insulating elements are at least partially folded or bent. In particular, by means of the combination of the lowering movement, the electrically conductive elements disposed above the respective electrically insulating elements, and the laterally arranged positioning jaws, the electrically insulating elements are folded or bent, in particular peripherally, at a marginal area protruding over the electrically insulating element. The plies of the cell assemblies and/or plies are surrounded or enclosed in a particularly simple manner by the planar electrically insulating element edging the cell assembly.

According to an advantageous refinement, it is provided that the positioning jaws are arranged in such a manner that, during the movement of the cell assemblies and/or plies, the electrically insulating elements are folded in such a way that the electrically insulating elements each rest against one of the electrically conductive elements. Preferably, the electrically insulating elements rest against the anode. For example, the positioning jaws are configured in such a way that they raise the protruding insulator upwards in a defined manner and the latter thus rests against the anode. In addition or as an alternative, the positioning jaws are preferably arranged in such a manner that, during the movement of the cell assemblies and/or plies, the electrically insulating elements are folded in such a way that the electrically insulating elements rest against an inner side of the positioning jaws. In particular, the bent part of the electrically insulating element is disposed between the positioning jaw and the plurality of cell assemblies and/or plies.

Advantageously, the cell stack is fixed prior to removing the cell stacks, in particular positively or by substance-to-substance connection, particularly preferably by gluing or laminating or by means of clamping, e.g., by means of a clamping plate.

Another advantageous embodiment provides that after fixing the cell stack, the positioning units are opened and the cell stack, together with the fixation, is removed from the device. For example, the cell stack may be removed by means of a gripper.

The invention also includes refinements of the device according to the invention and of the method according to the invention, which comprise features as they were already described in connection with the refinements of the device according to the invention and the method according to the invention. For this reason, the respective refinements of the device according to the invention and of the method according to the invention are not described again herein.

BRIEF DESCRIPTION OF THE DRAWINGS

An exemplary embodiment will be explained in more detail below with reference to the attached drawings. In the drawings.

The exemplary embodiments explained below are preferred embodiments of the invention. In the exemplary embodiments, the described components of the embodiments each constitute individual features of the invention, which are to be considered independently of each other and which also develop the invention independently from each other in each case, and are thus to be deemed constituent elements of the invention individually or in a combination other than that which is shown. Moreover, the described embodiments can also be supplemented with further features of the invention already described.

DETAILED DESCRIPTION OF THE PREFERRED EMBODIMENTS

Figure 1:
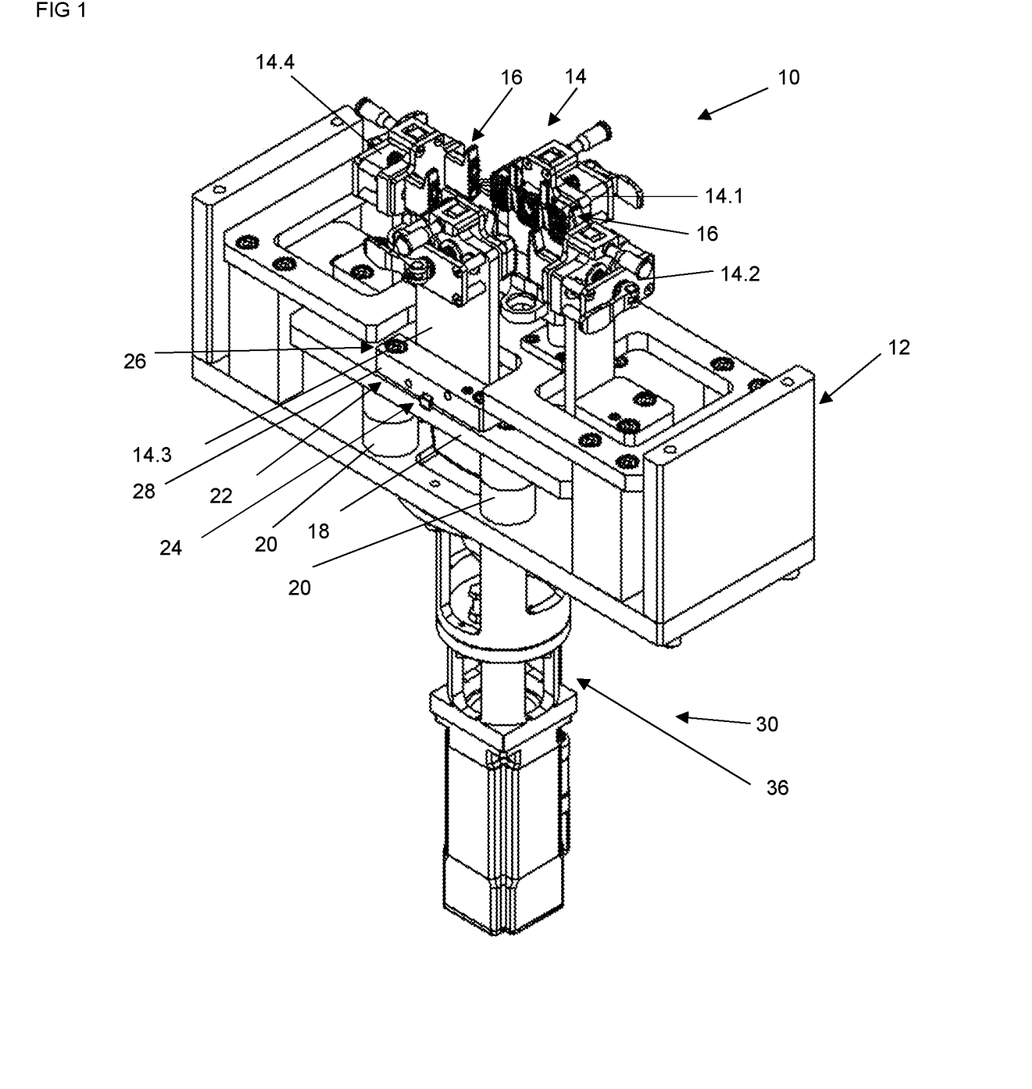
FIG. 1 shows a schematic representation in a perspective view of a device for manufacturing a cell stack, which comprises a basic body, several positioning units, a moving plate, a support, a first moving unit and a second moving unit.
Figure 2:
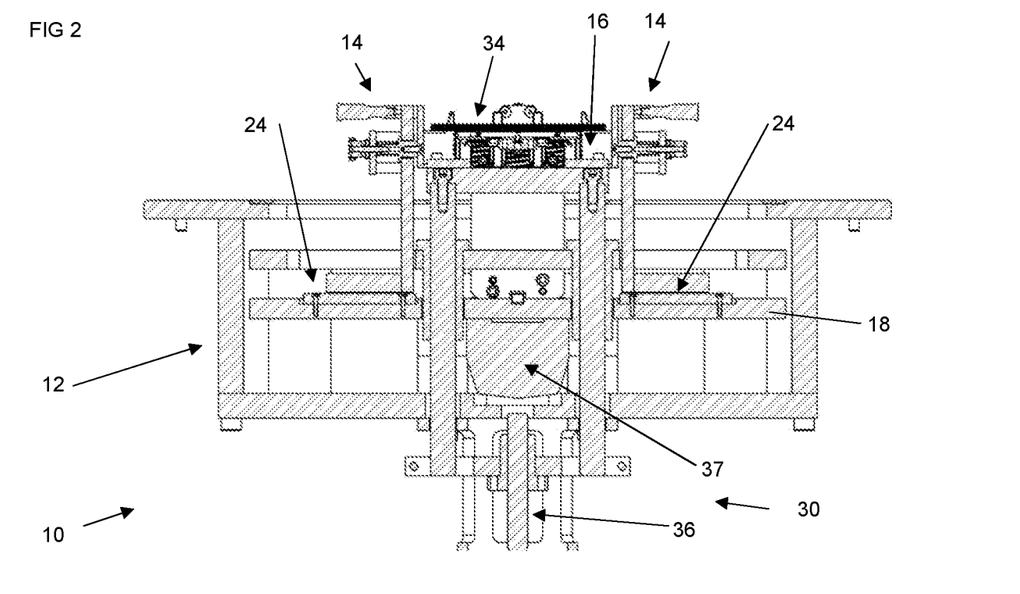
FIG. 2 shows a schematic representation in a sectional view of the device for manufacturing a cell stack of FIG. 1 in a loading position of the support.
Figure 3:
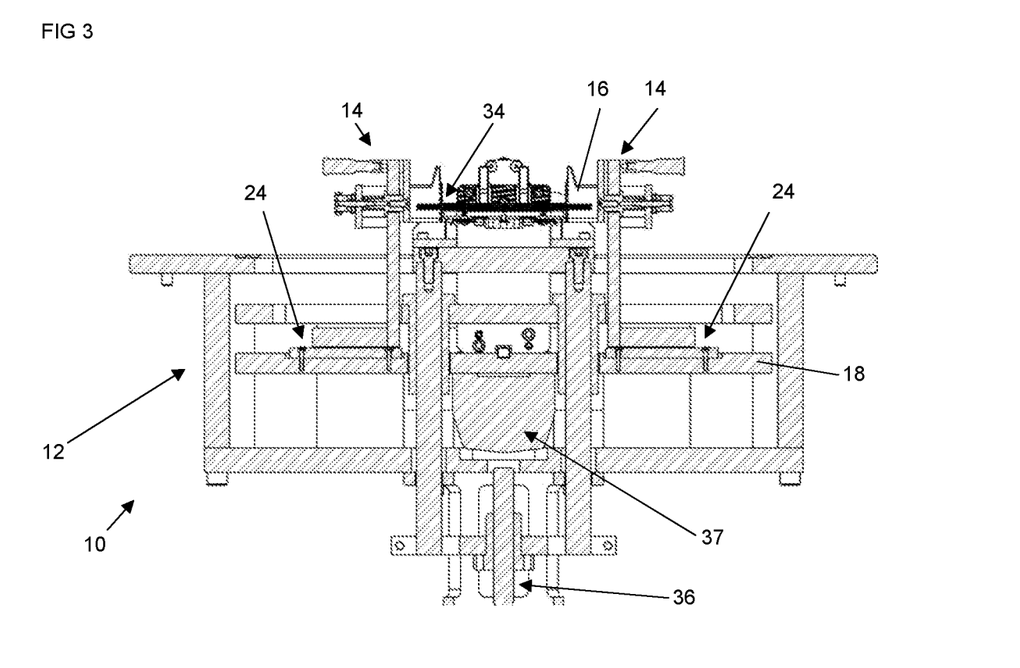
FIG. 3 shows a schematic representation in a sectional view of the device for manufacturing a cell stack of FIG. 1 in an aligning position of the support.

FIGS. 1 to 3 show a schematic representation of a device 10 for manufacturing a cell stack. A cell stack comprises several cell assemblies. Alternatively, the cell stack may also include individual plies. The exemplary embodiments described below are directed towards cell stacks with several cell assemblies. Accordingly, the exemplary embodiments described may include individual plies instead of the cell assemblies. The respective cell assemblies include several electrically conductive elements, in particular, two electrically conductive elements. The electrically conductive elements may be an anode and a cathode. The respective cell assemblies further include several electrically insulating elements, in particular, two electrically insulating elements. The electrically insulating element may preferably be an insulator which may also be referred to as a separator. Preferably, the respective cell assemblies are formed from planar or plate-shaped elements—electrically conductive elements and electrically insulating elements.

The device 10 comprises a basic body 12. The basic body 12 may be configured as a frame or support or base rack. The basic body 12 may be attached, in particular screwed, to a machine table (not shown in the Figures). Several positioning units 14 are arranged on the basic body 12 of the device 10. In this case, the device 10 has four positioning units 14—a first positioning unit 14.1, a second positioning unit 14.2, a third positioning unit 14.3 and a fourth positioning unit 14.4. The structure of the respective positioning units 14 will be addressed in more detail in connection with FIG. 4. The positioning units 14 are arranged, in pairs, opposite each other. Moreover, the respective positioning units 14 are, successively or adjacently, arranged at right angles or orthogonally. Together, the positioning units 14—the first positioning unit 14.1, the second positioning unit 14.2, the third positioning unit 14.3 and the fourth positioning unit 14.4—enclose an accommodating portion or accommodating surface.

The positioning units 14 are configured for accommodating the plurality of cell assemblies. In other words, the several positioning units 14 in their entirety are configured for accommodating the plurality of cell assemblies. In other words, the plurality of cell assemblies may be disposed between the positioning units 14 in the accommodating portion. Moreover, the positioning units 14 each comprise one positioning jaw 16. The positioning jaws 16 of the positioning units 14 are configured for enclosing the plurality of cell assemblies disposed one above the other. In particular, "positioning jaw" means a jaw that is configured as a movable lateral part or movable side surface for clamping and/or holding and/or locking and/or pressing and/or positioning the cell assemblies. The positioning jaw 16 may also be referred to as an aligning jaw.

The device 10 further comprises a first moving unit including a moving plate 18 and an actuator 37. The positioning units 14 are disposed on or attached to the moving plate 18. The moving plate 18 is configured as a plate or plate-shaped workpiece. The moving plate 18 is attached to or disposed on or mounted on the basic body 12 on bearings 20 of the device 10. The bearings 20 may be configured as rubber bearings. Preferably, the moving plate 18 is mounted on four bearings. The moving plate 18 is disposed between the bearings 20 and the positioning units 14.

The actuator 37 of the first moving unit is configured for vibrating the moving plate 18 and/or the positioning units 14. For this purpose, the actuator 37 is coupled to the moving plate 18. The moving plate 18 vibrates and/or the positioning units 14 vibrate due to the movement of the moving plate 18 and/or the positioning units 14 initiated by the first moving unit or the actuator 37. The moving plate 18 may also be referred to as a vibration plate. In order to move the moving plate 18 and/or the positioning units 14, the actuator 37 is configured as a motor, particularly as a vibrating motor. As is apparent from FIG. 2, the actuator 37 is disposed underneath the moving plate 18 in the vertical direction of the device 10.

The positioning units 14 are attached to the moving plate 18, in particular positively, by means of a fastening device 22, and/or can be positioned thereon. In order to position and/or attach the respective positioning unit 14.1, 14.2, 14.3, 14.4, the fastening device 22 includes a pin 26 or a screw or a bolt. At an and portion, the respective positioning unit 14.1, 14.2, 14.3, 14.4 has a sole portion via which the respective positioning unit 14.1, 14.2, 14.3, 14.4 is attached to the moving plate 18 by means of the pin 26 or screw or bolt. In particular, "sole portion" means an end portion via which the respective positioning unit 14.1, 14.2, 14.3, 14.4 is connected to the moving plate 18. The sole portion 28 forms a cuboid appendage at an end or end portion of the respective positioning unit 14.1, 14.2, 14.3, 14.4. The respective positioning unit 14.1, 14.2, 14.3, 14.4 may also be attached to the moving plate 18 with several pins or screws or bolts. The pin 26 or screw or bolt passes through the sole portion 28 of the respective positioning unit 14.1, 14.2, 14.3, 14.4 and connects the positioning unit 14.1, 14.2, 14.3, 14.4, in particular positively, with the moving plate 18. In order to position and/or attach the respective positioning unit 14.1, 14.2, 14.3, 14.4, the fastening device 22 further includes a key member 24, which is configured, in particular, as a key. For example, the positioning may be realized by means of the pin 26 seated in the sole portion 28 of the respective positioning unit 14.1, 14.2, 14.3, 14.4, and/or the key retained in the moving plate 18. The key engages a groove at an underside of the respective positioning unit or the sole portion 28 of the respective positioning unit 14.1, 14.2, 14.3, 14.4 facing towards the moving plate 18 and a groove of the moving plate 18, in particular in a surface of the moving plate 18, which faces towards the positioning unit 14.1, 14.2, 14.3, 14.4. This results in a positive connection between the moving plate 18 and the respective positioning unit 14.1, 14.2, 14.3, 14.4.

Depending on the cell stack to be manufactured, the positioning units 14 can be replaced. For this purpose, the fastening device 22 is to be loosened.

Moreover, the device 10 has a second moving unit 30 and a support 34 (not shown in FIG. 1). The support 34 is disposed on the second moving unit 30. The second moving unit 30 is configured for moving or displacing the support 34 in a vertical direction of the device 10. In other words, the second moving unit 30 can move the support 34 upwards or downwards. In particular, the second moving unit 30 can move the support 34 from a loading position into an aligning position and, vice versa, from an aligning position into a loading position. In this case, the loading position is located above the aligning position in the vertical direction of the device 10. During the movement from the loading position into the aligning position, the support 34 moves from the positioning jaws 16 in the direction of the sole portion 28 of the positioning unit 14, but stays, in particular, on the level of the positioning jaws 16. In particular, the vertical direction extends parallel to the plane of the drawing. In FIG. 2, the support 34 is located in the loading position. In the loading position, the support 34 is loaded, in particular, with the cell assemblies, i.e., the cell assemblies are stacked or disposed on the carrier 34. In FIG. 3, the support 34 is located in the aligning position. During the movement into the aligning position, the support 34 moves together with the cell assemblies disposed thereon.

Prior to centering, the cell assemblies are placed on the support 34 in the loading position of the support 34. In other words, the cell assemblies can be stacked, preferably loosely, on the support 34 prior to centering. In the process, the support 34 is at first located in the loading position (FIG. 2). In order to center the cell assemblies, the second moving unit 30 drives or moves the support 34 into the aligning position (FIG. 3). During the movement of the support 34 from the loading position into the aligning position, the first moving unit or the actuator 37 of the first moving unit additionally moves the positioning units 14. The second moving unit 30 lowers the support 34 in the vertical direction of the device 10 when moving the positioning units 14 in order to center or align the cell assemblies. In other words, the cell assemblies disposed on the support 34 are accommodated or enclosed between the positioning units 14 or moved into the accommodating portion between the positioning units 14 by the lowering or downward movement of the support 34 and the movement of the positioning units 14.

The second moving unit 30 and/or the support 34 are mounted on bearings, in particular, rubber bearings. By mounting the second moving unit 30 and/or the support 34 on bearings, the second moving unit 30 and/or the support 34 are decoupled from the movement of the first moving unit or the actuator 37 of the first moving unit.

The movement of the support 34 for aligning the cell assemblies is to be addressed in more detail in connection with FIGS. 2 and 3. The support 34 is disposed upon or on the second moving unit 30. In this case, the support 34 is movable relative to the basic body 12. The second moving unit 30 and/or the support 34 are mounted on bearings and are thus decoupled from the vibrations of the actuator and/or the moving plate 18. The second moving unit 30 comprises a ball screw 36. During the movement, in particular vibration, of the positioning units 14 or positioning jaws 16, the support 34 is moved in a downward direction by means of the ball screw 36, in particular moved from the loading position into the aligning position. In the process, the support 34 is moved or displaced along a stroke axis of the second moving unit 30 or device 10. In FIG. 3, the support 34 together with the cell assemblies disposed thereon is located in the aligning position in the device 10, particularly between the positioning units 14 or the positioning jaws 16 of the positioning units 14. Once the support 34 is located in the aligning position, the individual plies of the cell assemblies are centered or aligned one above the other in a defined manner between the positioning jaws 16.

Figure 4:
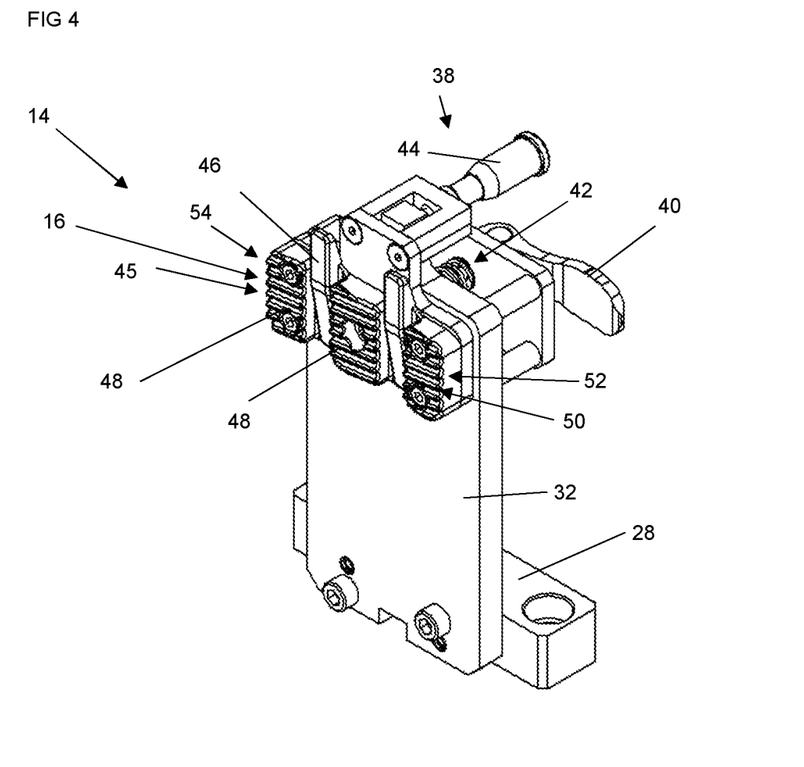
FIG. 4 shows a schematic representation in a perspective view of a positioning unit comprising a positioning jaw and an adjusting device.

FIG. 4 shows a perspective view of a positioning unit 14 of the positioning units. The positioning unit 14 has a positioning jaw 16 and a sole portion 28. The sole portion 28 of the positioning unit 14 is connected to the positioning jaw 16 via an intermediate part 32. The sole portion 28, the positioning jaw 16 and an adjusting device 38 are disposed on the intermediate part 32. The positioning jaw 16 is disposed on a front side of the intermediate part 32, particularly at an upper end portion of the intermediate part 32, and the sole portion 28 of the positioning unit 14 is disposed at a rear side of the intermediate part 32 facing away from the front side, in particular, at a lower end portion of the intermediate part 32 opposite the upper end portion. The intermediate part 32 is configured as a plate or plate-shaped workpiece. The positioning unit 14 can be attached and/or positioned on the moving plate 18 via the sole portion 28. At an underside of the positioning unit 14, particularly at an underside of the intermediate part 32 and of the sole portion 28, which, in particular, merge into each other or form a common surface, the positioning unit 14 has a groove which is engaged by the key member 24 for positioning and/or attaching.

Furthermore, the positioning unit 14 includes the adjusting device 38 for adjusting a position of the positioning jaw 16. The adjustment device 38 comprises an eccentric clamping lever 40 and another spring member 42. The further spring member 42 may be configured as a compression spring. For adjusting a position of the positioning jaw 16, the eccentric clamping lever 40 is moved. In this case, the further spring member 42 is configured, when the positioning jaw 16 moves, to push it onto a stop of the positioning unit 14. Moreover, the adjusting device 38 includes an adjusting screw 44. In particular, the adjusting screw 44 is configured as a micrometer screw. The adjusting screw 44 is configured for adjusting a position of the stop.

In order to be able to remove the entire cell stack, i.e., the plurality of cell assemblies, from the device 10 after the alignment in the position, the positioning jaws 16 have to be moved away from the support 34. The eccentric clamping lever 40 is flipped for this purpose. The compression spring ensures that the positioning jaws 16 are pushed against the stop or fixed stop during the advancing movement. A defined position of the positioning jaws 16 is thus ensured. The adjustment as a fixed stop or of the stop is carried out by means of the adjusting screw 44.

As is apparent from FIG. 4, the positioning jaw 16 of the positioning unit 14 has a positioning surface 45 on an inner side, which, in particular, faces away from the sole portion 28 or the intermediate part 32. The positioning surface 45 is divided into at least two positioning surface portions 46, 48. In other words, the positioning jaw 16 has a multi-part structure or is divided into several portions or surface portions. A first positioning surface portion 46 has a smooth surface. A second positioning surface portion 48 has grooves 50.

As shown in FIG. 4, the respective positioning surface portions 46, 48 are divided or separated. In this case, a part of the second positioning surface portion 48, a part of the first positioning surface portion 46, a part of the second positioning surface portion 48, a part of the first positioning surface portion 46 and, again, a part of the second positioning surface portion are disposed next to one another, in particular perpendicularly to the vertical direction of the device 10, and/or in sequence. The parts of the first positioning surface portion 46 are disposed between the parts of the second positioning surface portion 48. Together, the respective parts of the first positioning surface portion 46 add up to the first positioning surface portion 46, and/or the respective parts of the second positioning surface portion 48 add up to the second positioning surface portion 48.

Figure 5A:
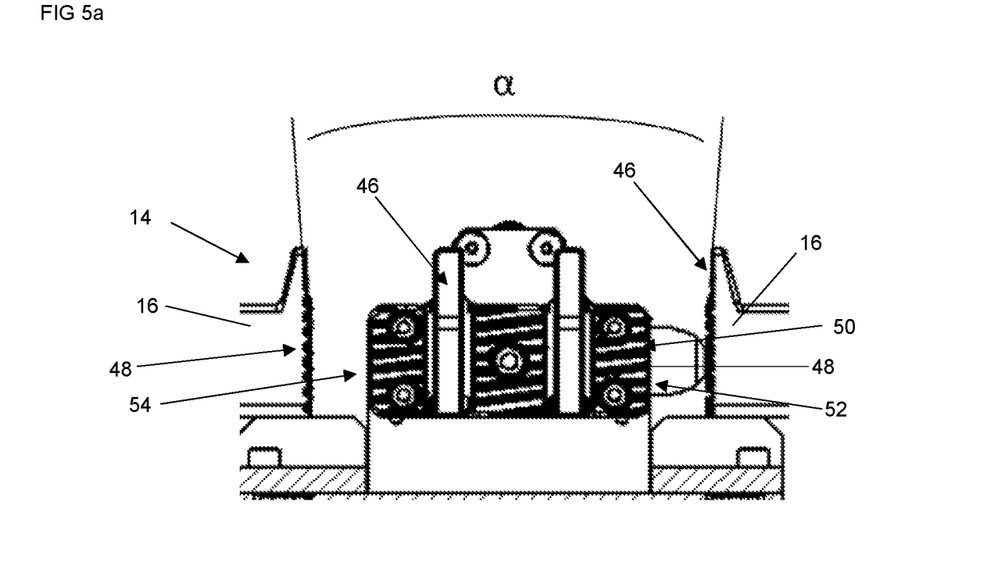
FIG. 5*a* shows a schematic representation of a part of the device with an assembly of the positioning jaws.
Figure 5B:
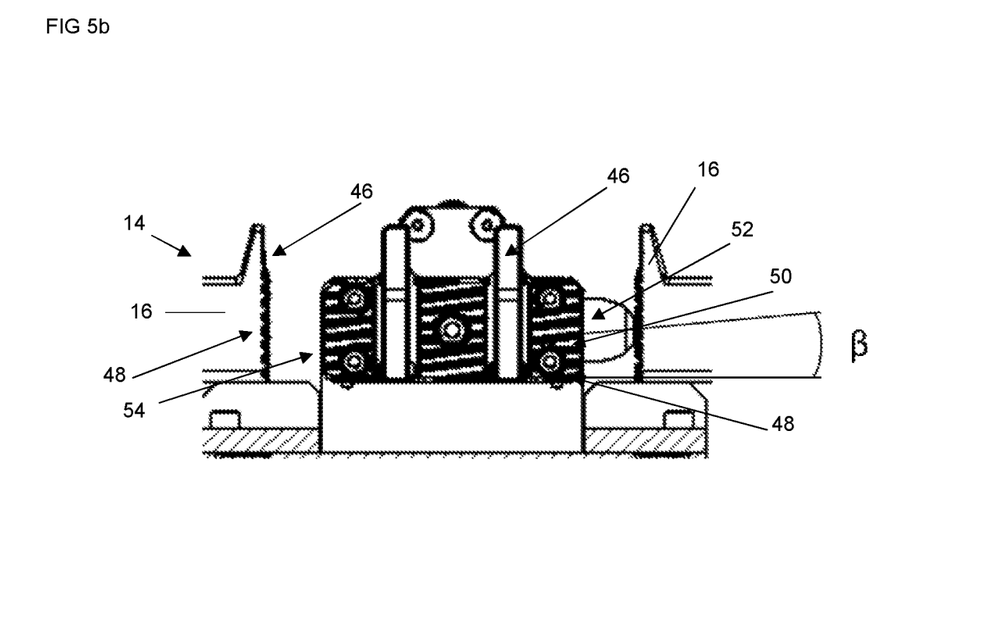
FIG. 5*b* shows a schematic representation of a part of the device with an assembly of the positioning jaws.

The configuration of the positioning surface 45 of the respective positioning unit 14 is to be addressed in more detail in connection with FIGS. 5a and 5b.

As is apparent from FIG. 5a, the surface of the first positioning surface portion 46 is disposed to be inclined at a predetermined angle to the vertical direction of the device 10. In other words, the surface of the first positioning surface portion 46 may be arranged obliquely, particularly at the angle, to the vertical direction of the device 10. In other words, the surface 46 of the first positioning surface portion 46 may have an inclined portion or steep plane. For example, the surface of the first positioning surface portion 46 may be disposed or oriented at an angle of between 5° and 90°, preferably between 5° and 45°, particularly preferably between 5° and 30°, to the vertical direction of the device. In particular, an angle $\alpha$ is formed between two opposite first positioning surface portions 46. For example, the angle $\alpha$ may be between 5° and 90°, preferably between 5° and 45°, particularly preferably between 5° and 30°. The inclined portion of each first positioning surface portion 46 is identically configured in each of the positioning units 14.1, 14.2, 14.3, 14.4. Together, the inclined first positioning surface portions 46 form, in particular, a funnel shape. By means of the first positioning surface portions 46, the cell assemblies can be pre-positioned or slide into the accommodating portion in which the cell assemblies are aligned or centered.

As is apparent from FIG. 5b, the grooves 50 of the second positioning surface portion 48 extend parallel to one another with a predetermined spacing. In this case, the grooves 50 extend at a predetermined angle $\beta$ from an end portion 52 of the positioning jaw 16 to an opposite end portion 54 of the positioning jaw 16. In other words, the grooves 50 may run diagonally from the top to the bottom or from the top towards the bottom in an oblique manner. In this case, the grooves 50 are disposed at the predetermined angle $\beta$ to the transversal plane of the positioning unit 14 or the device 10. In particular, "transversal plane" means a transverse plane perpendicular to a longitudinal axis or vertical direction of the device 10 or the positioning jaw. The transversal plane may also be referred to as a horizontal plane.

Comparing FIG. 5a with FIG. 5b, it becomes apparent that the first positioning surface portion 46 is disposed, in the vertical direction of the device 10, above the second positioning surface portion 48. In other words, the first positioning surface portion 46 and the second positioning surface portion 48 may be disposed next to each other and one above the other. In the upper area, the positioning jaws 16 are formed with a smooth surface and the predetermined angle $\alpha$. Thus, it is accomplished that a certain pre-positioning takes place when the individual cell assemblies are placed one above the other. The grooves 50, which are configured with the angle $\beta$, can be seen in the lower area of the positioning jaws 16. The second positioning surface portion 48 and/or the angle $\beta$ of the grooves 50 or the orientation of the grooves 50 at the angle β ensures that the electrically insulating elements fold up in a vertical line, i.e., in the vertical direction of the device 10. The folding process will be addressed in more detail in connection with FIG. 6.

Figure 6:
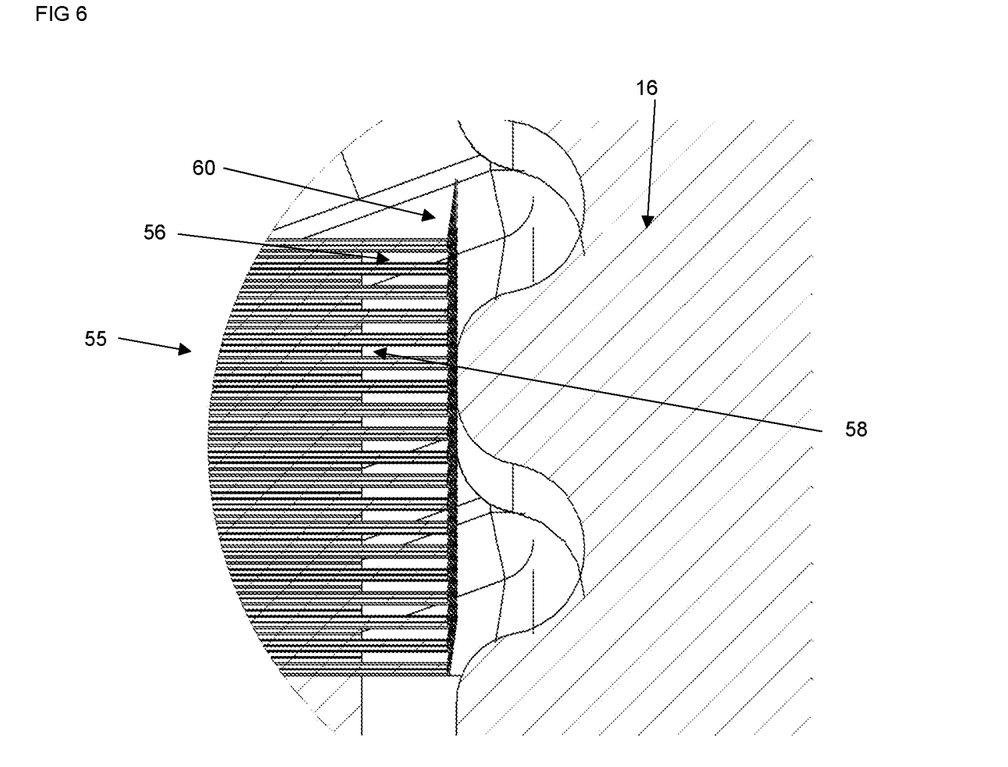
FIG. 6 shows a schematic representation of a part of the device loaded with several cell assemblies.

In FIG. 6, the cell assemblies 55 are located between the positioning jaws 16. As was already explained in the introduction, the cell assemblies 55 include several electrically conductive elements, in particular two electrically conductive elements. In this case, the cell assemblies 55 include as electrically conductive elements one or more anodes 56 and cathodes 58. One electrically insulating element, i.e., a separator 60, is disposed in each case between the anodes 56 and the cathodes 58. The anodes 56 and cathodes 58 as well as the separators 60 are planar or configured as a plate-shaped member or plate. In this case, a separator 60, an anode 56, a separator 60 and a cathode 58 are arranged in sequence, or a separator 60, a cathode 58, a separator 60.

In this case, the anode 56 has a larger surface area than the cathode 58. Furthermore, the separators 60 are configured to be larger, in particular peripherally, than the larger electrically conductive element, i.e., the anode 56. In other words, a surface of the separator 60 may be configured to be larger than the larger electrically conductive element, i.e., the anode 56. Thus, a surface area of the separator 60 is larger than a surface area of the anode 56. In this case, a marginal area of the separator 60 protrudes over the anode 56, in particular peripherally. In addition, the anode 56 is configured to be more rigid than the cathode 58 and more rigid than the separator 60.

The separators 60 are disposed underneath the anode 56 in the vertical direction of the device 10. A surface of the separator 60 protrudes over a surface of the anode 56, in particular peripherally. The cell assemblies 55 are moved past the laterally located positioning units 14 or positioning jaws 16 by moving the positioning units 14 and lowering, in particular simultaneously, the support 34 with the cell assemblies 55 disposed thereon. Due to this movement, the respective separators 60, particularly the protruding marginal area of the separators 60, are folded upwards.

Thus, the positioning jaws 16 are arranged such that, during the movement of the cell assemblies 55, the separators 60 are folded, or the protruding part of the separators 60 is bent, in such a way that the separators 60 rest against the anode 56 in each case. In other words, the positioning jaws 16 are configured in such a way that they raise the protruding or projecting separator 60 upwards in a defined manner and the latter thus rests against the anode 56. In addition or as an alternative, the positioning jaws 16 are arranged such that, during the movement of the cell assemblies 55, the separators 60 are folded in such a way that the separators 60 rest against an inner side of the positioning jaws 16 in each case.

The individual cell assemblies 55 are moved past the laterally located positioning jaws 16 by the vibration of the positioning jaws 16 and the simultaneous lowering of the moving unit 30 or the support 34. The separator 60 is folded upwards by this movement. The positioning jaws 16 are designed in such a way that a constant touching of the anode 56 takes place due to the obliquely configured grooves 50 in the positioning jaws 16. Thus, the separators 60 come to rest against the anode 56 located thereabove, and thus bring the anode 56 into an exact position, whereby the cell assemblies 55 are, in particular, centered between the positioning units 14.

Since the anode 56 is, on the one hand, larger than the cathode 58 and, on the other hand, has a greater inherent rigidity than the separator 60, the separator 60 or the respective separators 60 are used as aligning element for the entire cell stack or the cell assemblies 55. In this case, the individual cell assemblies 55 are placed roughly one above the other in the device 10. Due to the subsequent shaking process, i.e., the movement of the positioning units 14, and the lowering of the support 34 with the cell assemblies 55 between the obliquely extending positioning jaws 16, all layers or cell assemblies are positioned relative to one another by the individual grooves 50.

Once all the cell assemblies 55 have been lowered, the separator 60, or the marginal areas of the separators 60, are disposed between the positioning jaws 16 and the cell assemblies 55.

After lowering the cell assemblies 55 and/or prior to removing the cell stack, the cell assemblies 55, or the cell stack, are fixed, in particular positively or by substance-to-substance connection, particularly preferably by gluing or laminating or by means of a clamping plate.

After fixing the cell stack, the positioning units 14 are opened and the cell stack, e.g., with a fixation on the support plate, is removed from the device 10. For example, the cell stack may be removed by means of a gripper.

A specific exemplary embodiment will be discussed below:

The individual cell assemblies or also plies are aligned above the center. All individual cell assemblies or also plies are aligned centrically with respect to one another. This is accomplished by means of movable positioning jaws 16 on all 4 sides of the cell stack, and by means of a support 34 decoupled from the positioning jaws 16. The support 34 on which the cell assemblies and/or plies are stacked does not vibrate. In order to obtain an alignment above the center, the individual cell assemblies and/or plies are displaced relative to one another in all 4 directions, particularly in the plane. In this case, the movement of the positioning jaws 16 and the spacing between them can always be specifically adjusted to the dimensions of the starting materials, i.e., particularly the cell assemblies and/or plies. In particular, centering above the center of all cell assemblies and/or plies can thus be accomplished even though the components, i.e., the cathode, the separator and the anode, have different sizes. Thus, "starting materials" means the material for the manufacture of a cell stack, i.e., the plies and/or cell assemblies or laminates.

In this case, the method runs independently of gravity.

On the whole, a device for stacking laminated or glued cell stacks or cell assemblies to form a cell stack is described by the invention.

From a preceding working process, electrodes are connected with a continuous separator to form an electrode band. The connection is established either by a laminating process or by gluing. In the next working process, the separator is separated between the cell assemblies, so that loose cell assemblies consisting of one or two electrode sheets and one or two separators are manufactured. These loose cell assemblies have to be stacked in a very exact manner to form a complete cell stack.

The thought is based on the idea that the individual cell assemblies are placed one above the other only roughly. Then, the individual plies of cell assemblies are centered one above the other by vibrations and a simultaneous lowering movement in laterally attached positioning jaws of the device. In this case, the positioning jaws are configured in such a way that they raise the protruding separator upwards in a defined manner and the latter thus rests against the anode. Since the anode has a certain inherent rigidity and is larger than the cathode, all of the individual cell stacks and cell assemblies become exactly aligned above the anodes.

The device comprises several assembly groups. The assembly groups include a base rack, a vibration plate, format parts and a lifting group. The base rack, which may also be referred to as a basic body, is firmly screwed to the machine table. The vibration plate, which is also referred to as a moving plate, rests on rubber bearings and is vibrated by a vibrating motor. The format parts, which are also referred to as positioning units, may be replaced and/or adjusted depending on the cell format. In the case of the positioning units, exact positioning takes place on the vibration plate. Positioning is realized by means of a pin seated firmly in the sole portion, and a key firmly retained in the vibration plate.

The support or workpiece support is located on the lifting group, which is also referred to as the second moving unit. The entire lifting group is mounted on rubber bearings and is thus decoupled from the vibrations of the vibrating motor.

While the positioning jaws of the positioning unit vibrate, the lifting group is moved in a downward direction by means of a ball screw. The travel path and axle speed of the ball screw may be varied, via this axle, depending on the dimensions, number and properties of the cell stack or the cell assemblies.

The workpiece support, together with the cell stack or the cell assemblies, is located in the device. In this position, the aligning position, the individual plies of the cell assemblies or cell stacks are positioned one above the other and/or next to each other in a defined manner.

In order to remove the entire cell stack or the cell assemblies from the device after the alignment in the lower position, the aligning jaws have to be moved away from the workpiece support. An eccentric clamping lever has to be flipped for this purpose. A compression spring ensures that the aligning jaws are pushed against a fixed stop during the advancing movement. A defined position of the jaws is thus ensured. The adjustment as a fixed stop is carried out by means of a micrometer screw.

The individual cell assemblies are moved past the laterally located positioning jaws by the vibration of the positioning jaws of the positioning units and the simultaneous lowering of the lifting group and the workpiece support. The separator is folded upwards by this movement.

The positioning jaws are designed in such a way that a constant touching of the anode takes place due to obliquely configured grooves in the jaws. Thus, the separators come to rest against the anode located thereabove, and thus bring the anodes into an exact position.

In the upper area, the positioning jaws are formed with a smooth surface and an angle ($\alpha$). Thus, it is accomplished that a certain pre-positioning takes place when the individual cell assemblies are placed one above the other. The grooves, which are also configured with an angle ($\beta$), can be seen in the lower area. The angle of the grooves ensures that, when the separator is folded up, the individual separators that are placed one above the other are in contact with the positioning jaws in a vertical line.

The laminating or gluing of in each case at least one anode, one cathode and one separator is the precondition for employing this shaking process. Since the anode is, on the one hand, larger than the cathode and, on the other hand, has a greater inherent rigidity than the separator, it is used as aligning element for the entire stack. By laminating or gluing the cell assembly (anode-separator-cathode-separator), any number of cell assemblies may be positioned relative to one another by means of this process step. In this case, the individual cell assemblies are placed roughly one above the other in the device. This may take place by means of a simple pick-and-place handling. Due to the subsequent shaking process and the lowering between the obliquely extending positioning jaws, all layers are positioned relative to one another by the individual anodes. Then, the cell stack is clamped in the device using a two-part cassette and thus retains the position of each individual layer.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Device
12 Basic body
14 Positioning units
14.1 First positioning unit
14.2 Second positioning unit
14.3 Third positioning unit
14.4 Fourth positioning unit
16 Positioning jaw
18 Moving plate
20 Bearing
22 Fastening device
24 Key member
26 Pin
28 Sole portion
30 Second moving unit
32 Intermediate part
34 Support
36 Ball screw
37 Actuator
38 Adjusting device
40 Eccentric clamping lever
42 Further spring member
44 Adjusting screw
45 Positioning surface
46 First positioning surface portion
48 Second positioning surface portion
50 Grooves
52 End portion
54 End portion
55 Cell assemblies
56 Anodes
58 Cathode
60 Separator

The invention claimed is:

1. A device for manufacturing a cell stack having a plurality of at least one of cell assemblies or plies, comprising:
a plurality of positioning units configured for accommodating the plurality of at least one of cell assemblies or plies, wherein
the positioning units each comprise a positioning jaw, wherein the positioning jaws are configured for enclosing the plurality of at least one of cell assemblies or plies disposed one above the other;

a first moving unit driving vibration or shaking movement of each of the plurality of positioning units, wherein the first moving unit comprises a moving plate mounted in a movable manner and an actuator, wherein the positioning units are disposed on the moving plate, wherein the actuator transfers vibrating or shaking movement to the moving plate, wherein the positioning units are arranged in such a manner that the at least one of cell assemblies or plies are centered centrally between the positioning jaws by a movement initiated by the first moving unit, and a support, wherein the plurality of at least one of cell assemblies or plies rest on the support, wherein the support is decoupled from the movement of the first moving unit.

2. The device according to claim 1, wherein the positioning jaws of the positioning units, 17.1 are configured for carrying out an advancing movement, towards the plurality of at least one of cell assemblies or plies; or 17.2 are movable individually or in pairs by the first moving unit.

3. The device according to claim 1, wherein the positioning units are at least one of positively attached to the moving plate, by means of a fastening device, or can be positioned thereon, wherein the fastening device includes at least one fastening member, comprising a pin, a screw, a bolt, or a key, wherein the respective positioning unit is at least one of attached to or can be positioned on the moving plate by means of the at least one of the at least one fastening member or key.

4. The device according to claim 1, wherein the positioning jaws of the positioning units, on an inner side thereof, each have a positioning surface, wherein the positioning surface is divided into at least two positioning surface portions, wherein a first positioning surface portion has a smooth surface and a second positioning surface portion has grooves.

5. A device for manufacturing a cell stack having a plurality of at least one of cell assemblies or plies, comprising:

a plurality of positioning units configured for accommodating the plurality of at least one of cell assemblies or plies, wherein the positioning units each comprise a positioning jaw, wherein the positioning jaws are configured for enclosing the plurality of at least one of cell assemblies or plies disposed one above the other;

a first moving unit configured for moving the positioning units, wherein the first moving unit comprises a moving plate mounted in a movable manner and an actuator, wherein the positioning units are disposed on the moving plate, wherein the actuator is configured for moving the moving plate, wherein the positioning units are arranged in such a manner that the at least one of cell assemblies or plies are centered centrally between the positioning jaws by a movement initiated by the first moving unit, and a support, wherein the plurality of at least one of cell assemblies or plies rest on the support, wherein the support is decoupled from the movement of the first moving unit, wherein the positioning jaws of the positioning units, on an inner side thereof, each have a positioning surface, wherein the positioning surface is divided into at least two positioning surface portions, wherein a first positioning surface portion has a smooth surface and a second positioning surface portion has grooves, and wherein at least one of 20.1 a surface of the first positioning surface portion is configured to be inclined at a predetermined angle to a vertical direction of the device, 20.2 the grooves of the second positioning surface portion extend with a predetermined spacing, parallel to each other, and at a predetermined angle, to a transversal plane of the positioning unit, from an end portion of the positioning jaw to an opposite end portion of the positioning jaw, 20.3 the first positioning surface portion is disposed, in the vertical direction of the device, above the second positioning surface portion, for pre-positioning the plurality of at least one of the cell assemblies or plies.

6. The device according to claim 4, wherein the device has four positioning units, wherein two positioning units are in each case arranged opposite each other and the positioning surfaces of the positioning units face towards each other.

7. The device according to claim 1, wherein the device at least one of 22.1 comprises a second moving unit disposed on the support, wherein the second moving unit, which comprises a ball screw, is configured for moving the support in a vertical direction of the device, when moving the positioning units; or 22.2 comprises at least one air nozzle configured for providing an air flow, wherein the air nozzle, due to the air flow, is configured for aligning the at least one of cell assemblies or plies, during the centering between the positioning units or during a movement of the positioning units.

8. The device according to claim 7, wherein the device comprises a basic body, wherein at least one of the support, or the positioning units, or the first moving unit, or the second moving unit are arranged on the basic body.

9. The device according to claim 1, wherein the at least one of cell assemblies or plies include, in each case arranged one above the other and next to each other, at least two electrically conductive elements and two electrically insulating elements, wherein one of the two electrically conductive elements, peripherally, is configured to be at least one of larger or more rigid than the other electrically conductive element, wherein the electrically insulating elements, peripherally, are configured to be larger than a larger of the electrically conductive elements, and wherein a rigidity of the electrically insulating elements is lower than a rigidity of at least one of the electrically conductive elements.

\* \* \* \* \*